United States Patent
Miyata

(10) Patent No.: US 11,153,455 B2
(45) Date of Patent: Oct. 19, 2021

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Takaaki Miyata, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/666,352

(22) Filed: Aug. 1, 2017

(65) Prior Publication Data

US 2018/0069980 A1    Mar. 8, 2018

(30) Foreign Application Priority Data

Sep. 8, 2016  (JP) .............................. JP2016-175881

(51) Int. Cl.
*H04N 1/00* (2006.01)
*G06F 1/3234* (2019.01)
(Continued)

(52) U.S. Cl.
CPC ..... *H04N 1/00896* (2013.01); *G03G 15/5004* (2013.01); *G06F 1/3221* (2013.01);
(Continued)

(58) Field of Classification Search
USPC ............ 358/1.1–3.29, 1.11–1.18; 369/44.27, 369/44.32, 47.11, 47.23, 47.5, 53.34,
(Continued)

(56) References Cited

U.S. PATENT DOCUMENTS 5,907,713 A * 5/1999 Chen ..................... G06F 1/3215
                                                             713/320
7,715,142 B2  5/2010 Ikenoue et al.
(Continued)

FOREIGN PATENT DOCUMENTS

CN   101570087   11/2009
CN   101813970    8/2010
(Continued)

OTHER PUBLICATIONS

European Search Report dated Dec. 20, 2017 in European Application No. 17181610.1.
(Continued)

*Primary Examiner* — Marcellus J Augustin
(74) *Attorney, Agent, or Firm* — Venable LLP

(57) ABSTRACT

A CPU of an information processing apparatus (MFP) obtains device information regarding a secondary storage device provided in the MFP, and discriminates, based on the obtained device information, whether the secondary storage device is a type of storage device in which the number of shifts to a power saving state affects the lifetime of the storage device. The CPU determines, as a shift condition for the secondary storage device to shift to the power saving state, a shift time for the secondary storage device to shift to the power saving state, by determining the shift time for the type of storage device in which the number of shifts does not affect the lifetime to be shorter than the shift time for the type of storage device in which the number of shifts affects the lifetime.

17 Claims, 4 Drawing Sheets

(51) Int. Cl.
*G06F 1/3228* (2019.01)
*G06F 1/3246* (2019.01)
*G06F 1/3225* (2019.01)
*G03G 15/00* (2006.01)
*G06F 1/3221* (2019.01)
*G06F 1/3287* (2019.01)
*H04N 1/21* (2006.01)

(52) U.S. Cl.
CPC .......... *G06F 1/3225* (2013.01); *G06F 1/3268* (2013.01); *G06F 1/3275* (2013.01); *G06F 1/3287* (2013.01); *H04N 1/00885* (2013.01); *H04N 1/00888* (2013.01); *H04N 1/00891* (2013.01); *H04N 1/2104* (2013.01); *H04N 2201/0094* (2013.01); *Y02D 10/00* (2018.01)

(58) Field of Classification Search
USPC ....................................................... 369/275.5
See application file for complete search history.

(56) References Cited

U.S. PATENT DOCUMENTS

| | | | |
|---|---|---|---|
| 7,797,556 B2 * | 9/2010 | Yamamoto | G03G 15/5004 713/300 |
| 8,595,530 B2 | 11/2013 | Koga | |
| 2002/0144057 A1 | 10/2002 | Li et al. | |
| 2008/0126701 A1 * | 5/2008 | Uehara | G06F 1/3221 711/114 |
| 2009/0274027 A1 * | 11/2009 | Tanaka | G11B 19/209 369/47.55 |
| 2009/0276650 A1 | 11/2009 | Kuroda | |
| 2010/0218023 A1 | 8/2010 | Yokoyama | |
| 2010/0228889 A1 * | 9/2010 | Uehara | G06F 9/4406 710/12 |
| 2011/0047316 A1 * | 2/2011 | Farhan | G06F 1/3275 711/103 |
| 2011/0066802 A1 | 3/2011 | Kawaguchi | |
| 2011/0099339 A1 * | 4/2011 | Hagiwara | G03G 15/50 711/154 |
| 2011/0119509 A1 * | 5/2011 | Yanagawa | G06F 3/067 713/320 |
| 2011/0185201 A1 * | 7/2011 | Kawakami | G11B 19/209 713/320 |
| 2011/0264854 A1 * | 10/2011 | Ouchi | G06F 3/0616 711/114 |
| 2011/0283128 A1 * | 11/2011 | Farhan | G06F 1/3215 713/324 |
| 2012/0140355 A1 * | 6/2012 | Carter | G11B 19/02 360/73.01 |
| 2012/0331322 A1 * | 12/2012 | Suzuki | G03G 15/5004 713/323 |
| 2013/0067256 A1 * | 3/2013 | Shiraishi | H01M 10/48 713/320 |
| 2014/0006816 A1 * | 1/2014 | Oikawa | G06F 1/3268 713/310 |
| 2014/0317444 A1 * | 10/2014 | Kushihara | G06F 3/0653 714/6.22 |
| 2015/0033057 A1 | 1/2015 | Maroney | |
| 2016/0103481 A1 * | 4/2016 | Griffith | G06F 1/3296 713/323 |
| 2016/0156798 A1 * | 6/2016 | Wang | H04N 1/00896 358/1.14 |
| 2016/0284379 A1 * | 9/2016 | Igashira | G11B 19/209 |
| 2017/0192685 A1 * | 7/2017 | Guyot | G06F 3/0608 |
| 2018/0210539 A1 * | 7/2018 | Hashimoto | G06F 3/0625 |
| 2019/0163419 A1 * | 5/2019 | Wang | G06F 3/1221 |

FOREIGN PATENT DOCUMENTS

| | | |
|---|---|---|
| CN | 102218947 | 10/2011 |
| CN | 103513980 | 1/2014 |
| JP | 2009-070449 A | 4/2009 |
| WO | 2010/109675 A1 | 9/2010 |

OTHER PUBLICATIONS

Chinese Office Action dated May 8, 2019 during prosecution of related Chinese application No. 201710788128.2. (Whole English-language translation included.).

Korean Office Action dated Jul. 6, 2020 in related Korean Application No. 10-2017-0111563 (with whole English translation).

* cited by examiner

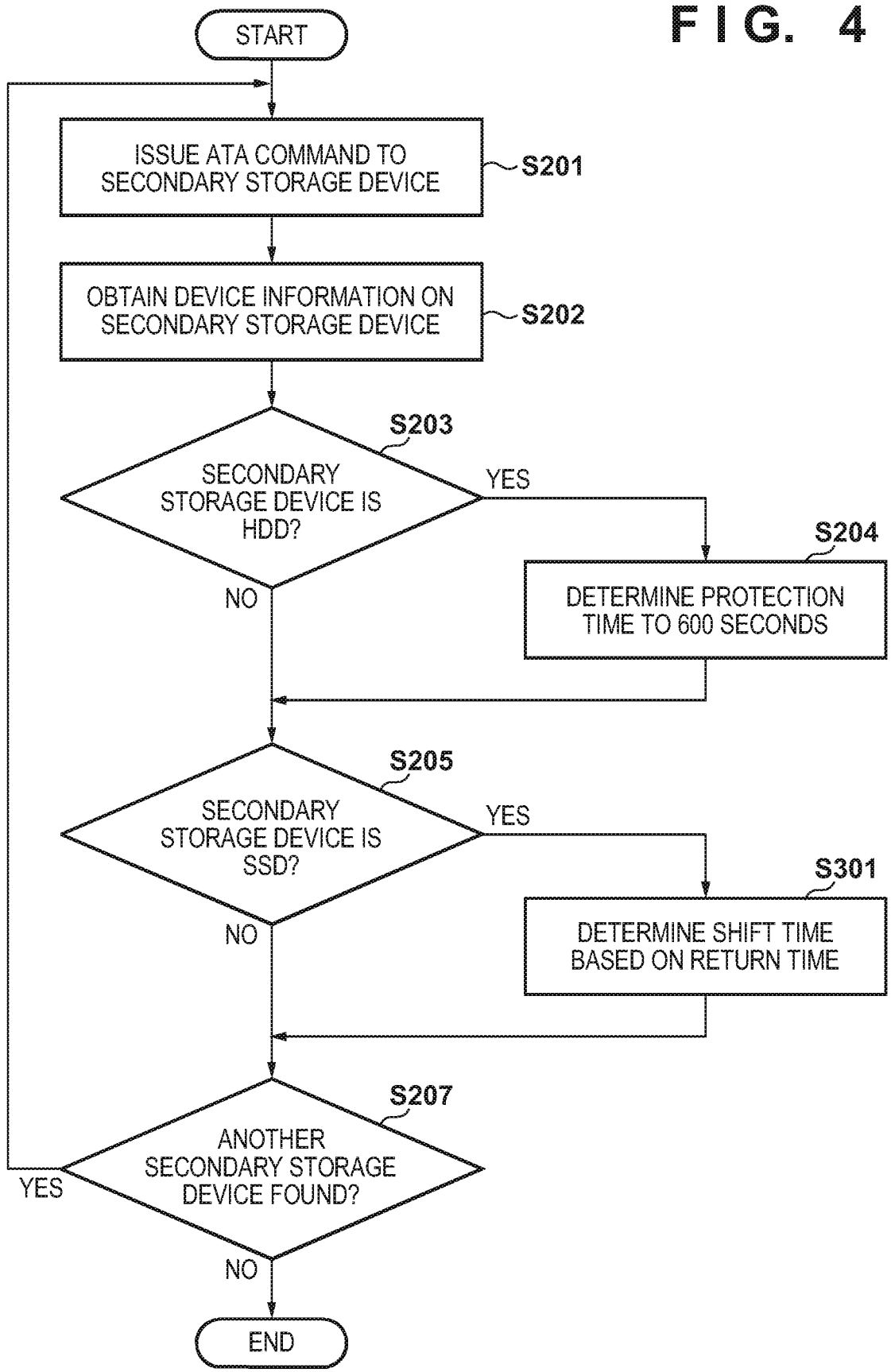

INFORMATION PROCESSING APPARATUS, CONTROL METHOD THEREOF, AND STORAGE MEDIUM

BACKGROUND OF THE INVENTION

Field of the Invention

The present invention relates to an information processing apparatus, a control method thereof, and a storage medium, and in particular to power control of a storage device incorporated in an information processing apparatus.

Description of the Related Art

In recent years, image forming apparatuses such as printers and MFPs (multifunction peripherals) tend to consume more power during normal operation. On the other hand, international regulations, namely, the International Energy Star Program, Blue Angel, ErP directive Lot 6 and Lot 26, etc. require that the power consumption of information equipment such as an image forming apparatus should be reduced to less than a predetermined value. In order to implement power saving in an image forming apparatus, there is, for example, a method in which the apparatus as a whole is shifted to a power saving state during standby and a method in which the devices included in the apparatus that are not in use are individually shifted to a power saving state even during a period other than during standby. In the latter method, it is effective to perform power control for shifting to a power saving state, separately on a hard disk drive (HDD) that particularly consumes a high amount of power among the devices included in the image forming apparatus.

However, if the HDD is frequently shifted to a power saving state in order to implement power saving, the HDD frequently spins up and down, which may shorten the lifetime of the HDD (the remaining time until the HDD is broken may be shortened). Accordingly, in order to avoid shortening of the lifetime of the HDD, Japanese Patent Laid-Open No. 2009-70449 proposes a technique in which the number of times in which power is supplied to a HDD incorporated in an image forming apparatus and the supply of power is stopped is controlled based on a result of determination of external dimensions of the HDD.

In recent years, attempts have been made to use, instead of the HDD as described above, an SSD (solid-state drive) as a secondary storage device incorporated in an image forming apparatus. However, the conventional technique described above gives consideration to a HDD incorporated in the image forming apparatus, but not to an SSD incorporated in the image forming apparatus. For this reason, it is necessary to appropriately perform power control on the secondary storage device even when an SSD is used as the secondary storage device in the image forming apparatus (information processing apparatus) in order to implement power saving of the image forming apparatus.

SUMMARY OF THE INVENTION

The present invention has been made in view of the problems described above. The present invention provides a technique that enables power control for implementing power saving in an information processing apparatus to be executed according to the type of storage device provided as a secondary storage device in the information processing apparatus.

According to one aspect of the present invention, there is provided an information processing apparatus comprising: an obtainment unit that obtains device information regarding a storage device provided in the information processing apparatus; and a determination unit that determines, based on the device information, a shift time to shift to a power saving state for a type of storage device in which a number of shifts of the storage device to the power saving state does not affect a lifetime thereof, to be shorter than the shift time for a type of storage device in which the number of shifts affects a lifetime thereof.

According to another aspect of the present invention, there is provided a method for controlling an information processing apparatus, the method comprising: obtaining device information regarding a storage device provided in the information processing apparatus; and determining, based on the device information, a shift time to shift to a power saving state for a type of storage device in which a number of shifts of the storage device to the power saving state does not affect a lifetime thereof, to be shorter than the shift time for a type of storage device in which the number of shifts affects a lifetime thereof.

According to still another aspect of the present invention, there is provided a non-transitory computer-readable storage medium storing a computer program for causing a computer to execute each step of a method for controlling an information processing apparatus, the method comprising: obtaining device information regarding a storage device provided in the information processing apparatus; and determining, based on the device information, a shift time to shift to a power saving state for a type of storage device in which a number of shifts of the storage device to the power saving state does not affect a lifetime thereof, to be shorter than the shift time for a type of storage device in which the number of shifts affects a lifetime thereof.

According to the present invention, it is possible to execute power control for implementing power saving in an information processing apparatus according to the type of storage device provided as a secondary storage device in the information processing apparatus.

Further features of the present invention will become apparent from the following description of exemplary embodiments (with reference to the attached drawings).

BRIEF DESCRIPTION OF THE DRAWINGS

FIG. 4 is a flowchart illustrating a procedure for determining a shift time to shift to a power saving state.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

A first embodiment will be described by taking, as an example of an information processing apparatus, a multifunction peripheral (MFP) that is an image forming apparatus (image processing apparatus) having many functions such as a print function, a copy function, an image transmission function, and an image storage function. The present embodiment is applicable not only to an MFP but also to an information processing apparatus such as a printing apparatus (printer), a copying machine, a facsimile machine, and a PC.

<MFP>

Figure 1:
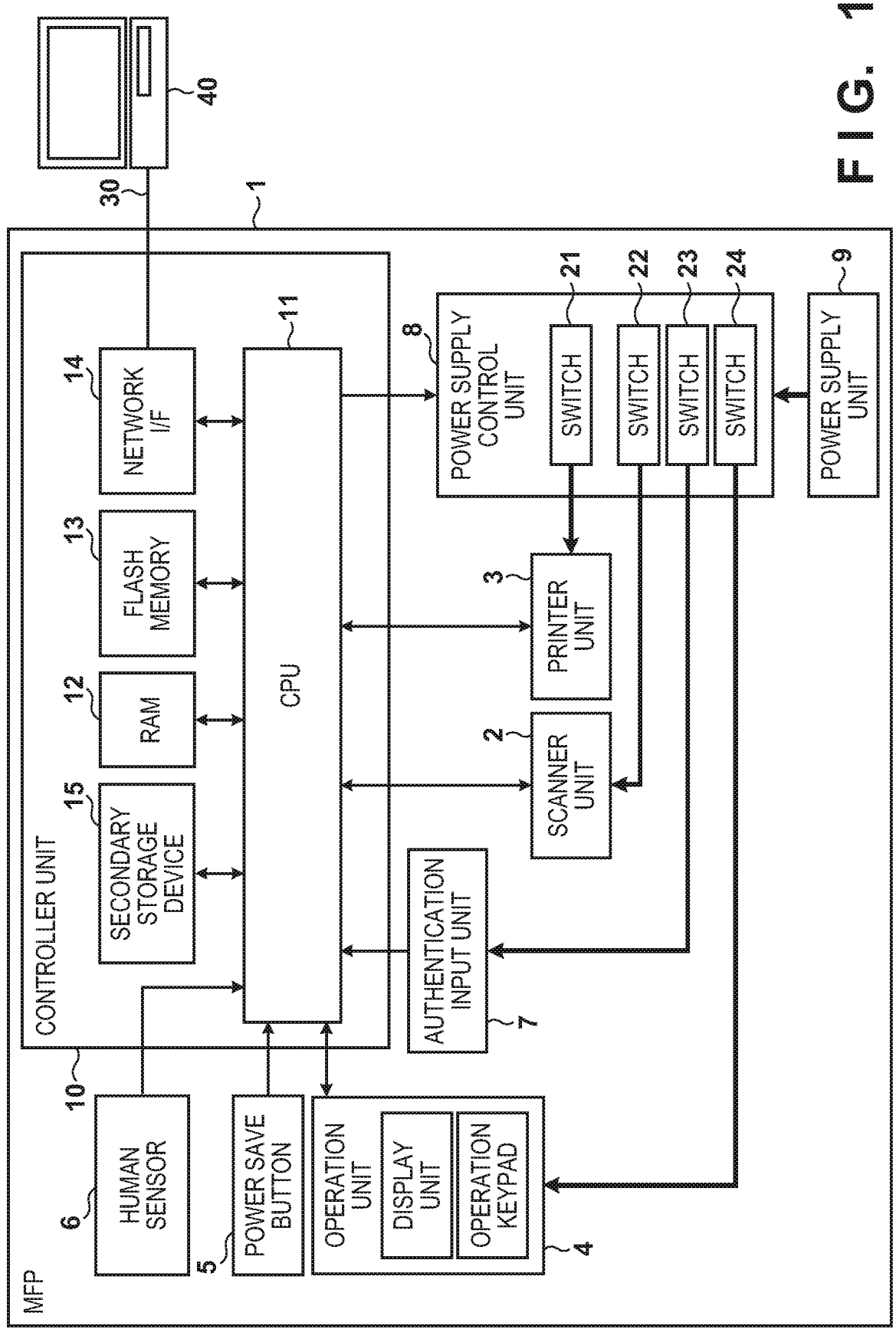
FIG. 1 is a block diagram showing an example of a configuration of an MFP.

FIG. 1 is a block diagram showing an example of a configuration of an MFP 1 according to the present embodiment. The MFP 1 includes a scanner unit 2, a printer unit 3, an operation unit 4, a power save button 5, a human sensor 6, an authentication input unit 7, a power supply control unit 8, a power supply unit 9, and a controller unit 10. The scanner unit 2 optically reads an image from an original and generates image data corresponding to the read image. The printer unit 3 prints the image on a sheet (recording paper or the like) based on the image data.

The controller unit 10 includes a CPU 11, a RAM 12, a flash memory 13, a network interface (I/F) 14, and a secondary storage device 15. The CPU 11 performs overall control of the MFP 1. The RAM 12 is used as a work memory for the CPU 11. The flash memory 13 stores therein control firmware required to activate the CPU 11. The network I/F 14 is a communication I/F that is connected to a network 30 such as a LAN. The CPU 11 is capable of performing communication with an external apparatus such as a PC 40 via the network I/F 14. The secondary storage device 15 is a non-volatile storage device in which various types of data are stored. In the secondary storage device 15, a control program and an application program that are executed by the CPU 11, and various types of data such as image data are stored.

The operation unit 4 is composed of a display unit (LCD) having a touch panel function and an operation keypad, and is used to accept a user operation and display various types of information. The power save button 5 is disposed near the operation unit 4, and is used to provide, to the MFP 1, an instruction to return from a power saving mode to a standby mode. The power save button 5 may be disposed in the operation unit 4, but in this case, the power save button 5 is electrically isolated from the operation unit 4, and is configured to receive supply of power even when the supply of power to the operation unit 4 is stopped. The human sensor 6 is disposed near the operation unit 4, and is used to detect a user coming closer to the MFP 1. The sensitivity of the human sensor 6 can be set in stages via the operation unit 4. The authentication input unit 7 accepts, from the user, an input of authentication information for use in user authentication.

The power supply control unit 8 controls supply of power from the power supply unit 9 to the devices included in the MFP 1 (the scanner unit 2, the printer unit 3, the operation unit 4, and the authentication input unit 7) in accordance with an instruction from the CPU 11. To be specific, the power supply control unit 8 includes a plurality of switches 21 to 24 composed of, for example, FET switches or relay switches, and controls supply of power to the devices by individually switching the switches between on and off in accordance with an instruction from the CPU 11.

The MFP 1 has the following power modes: a standby mode in which power is supplied to the devices included in the MFP 1; and a power saving mode in which supply of power to the devices included in the MFP 1 is stopped. In the standby mode, power is supplied to the scanner unit 2, the printer unit 3, the operation unit 4, and the authentication input unit 7. In the power saving mode, supply of power to all or part of the scanner unit 2, the printer unit 3, the operation unit 4, and the authentication input unit 7 is stopped so as to implement power saving of the MFP 1.

In the standby mode, if the power save button 5 is pressed by the user, the CPU 11 shifts the MFP 1 to the power saving mode. Likewise, in the power saving mode, if the power save button 5 is pressed by the user, the CPU 11 shifts the MFP 1 to the standby mode. The power save button 5 receives supply of power in the power saving mode as well such that the power save button 5 can be operated even when supply of power to the operation unit 4 is stopped. In the standby mode, if no job is executed for a predetermined length of time, the CPU 11 may automatically shift the MFP 1 to the power saving mode. Also, in the power saving mode, if a user is detected by the human sensor 6, the CPU 11 may shift the MFP 1 to the standby mode.

The secondary storage device 15 according to the present embodiment has an activation state in which supply of power (from the power supply unit 9) is not limited and a power saving state in which supply of power (from the power supply unit 9) is limited. In the power saving state, the secondary storage device 15 consumes less power than in the activation state. Accordingly, it is possible to reduce the power consumption of the apparatus (the MFP 1) in which the secondary storage device 15 is incorporated by maintaining the secondary storage device 15 in the power saving state as long as possible. In the present embodiment, the CPU 11 can control the state of the secondary storage device 15 independently of the power mode of the MFP 1. That is, the secondary storage device 15 can be separately shifted to the power saving state in accordance with an instruction from the CPU 11 even when the power mode of the MFP 1 is the standby mode.

In the MFP 1 according to the present embodiment, a HDD (hard disk drive) or an SSD (solid-state drive) is used as the secondary storage device 15. The secondary storage device 15 may be composed of a plurality of storage devices. In this case, for example, a combination of a HDD and an SSD may be used as the secondary storage device 15. In the case where the secondary storage device 15 is composed of a plurality of storage devices, the CPU 11 individually controls the state of the storage devices.

In the case where a HDD is used as the secondary storage device 15, the HDD spins down when a shift is made from the activation state to the power saving state, and spins up when a shift is made from the power saving state to the activation state. In general, the spin-down and spin-up (OFF/ON operations) of a HDD affect the lifetime of the HDD (or in other words, the remaining time until the HDD is broken). For example, the lifetime of a HDD expires after execution of OFF/ON operations approximately 300,000 times. For this reason, if the HDD is frequently shifted to the power saving state, the remaining time until the HDD is broken is shortened due to the execution of OFF/ON operations. As described above, the HDD is a type of storage device in which the number of shifts to the power saving state affects the lifetime of the storage device.

On the other hand, in the case where an SSD is used as the secondary storage device 15, the shift operation from the activation state to the power saving state and the shift operation from the power saving state to the activation state (OFF/ON operations) do not affect the lifetime of the SSD (or in other words, the remaining time until the SSD is broken). Thus, even if the SSD is frequently shifted to the power saving state, the remaining time until the SSD is broken is not shortened due to the execution of OFF/ON operations. For this reason, from the viewpoint of implementing power saving in the MFP 1, it is desirable that the SSD is shifted to the power saving state as frequently as possible. As described above, the SSD is a type of storage device in which the number of shifts to the power saving state does not affect the lifetime of the storage device.

<Overview of Power Control of Secondary Storage Device 15>

The MFP 1 according to the present embodiment determines a shift condition for shifting the secondary storage device 15 to the power saving state such that power control of the secondary storage device 15 can be executed more appropriately regardless of whether a HDD or an SSD is provided as the secondary storage device 15. To be specific, the CPU 11 obtains device information regarding the secondary storage device 15 provided in the MFP 1 and determines, based on the obtained device information, a shift time for the secondary storage device 15 to shift to the power saving state. The shift time corresponds to the shift condition for shifting to the power saving state, and is defined as, for example, a period of time after completion of the last access to the secondary storage device 15 until the secondary storage device 15 starts shifting to the power saving state. The CPU 11 determines, based on the obtained device information, the shift time for the type of storage device in which the number of shifts, which is the number of times of the storage device shifting to the power saving state, does not affect the lifetime, to be shorter than the shift time for the type of storage device in which the number of shifts affects the lifetime. By doing so, power control for implementing power saving in the MFP 1 can be executed on the secondary storage device 15 according to the type of storage device provided as the secondary storage device 15.

Figure 2:
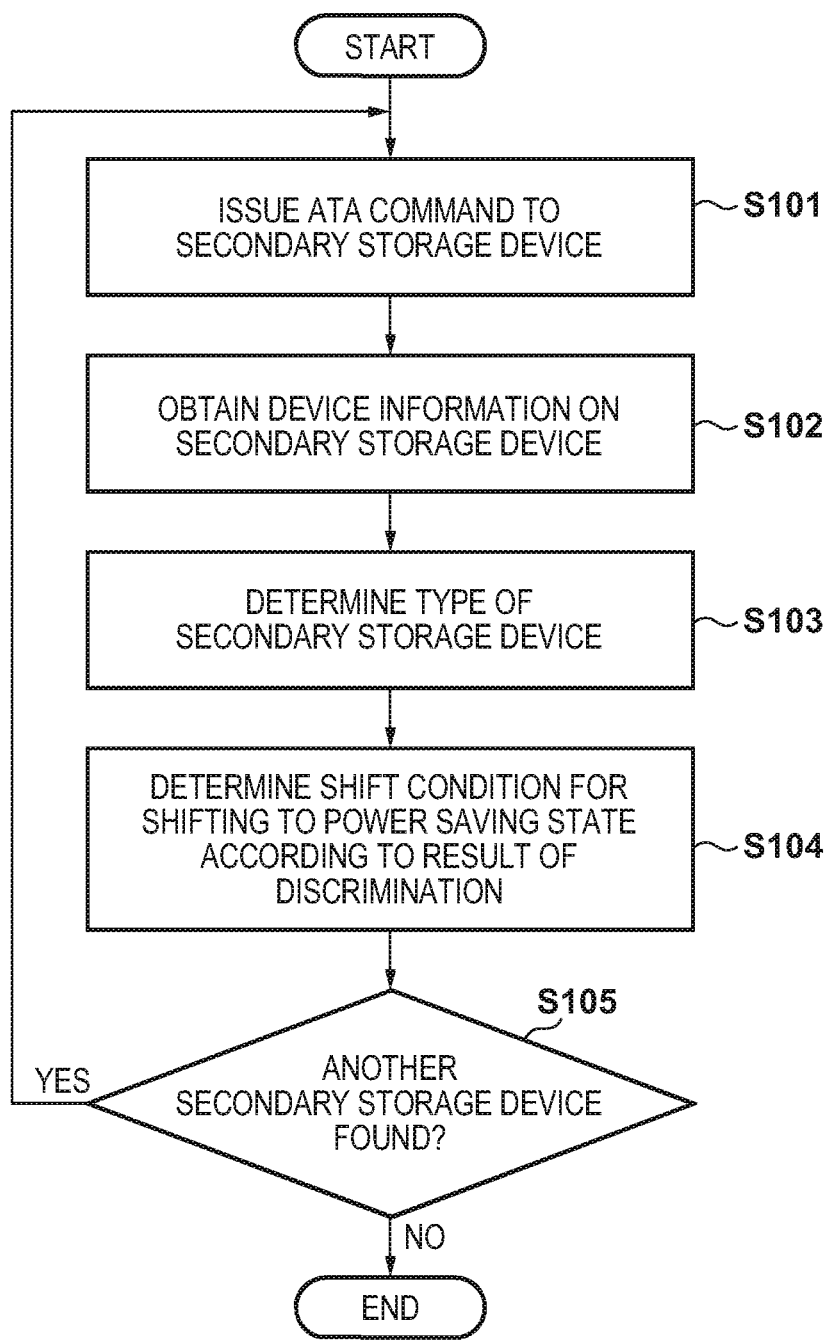
FIG. 2 is a flowchart illustrating a procedure for determining a shift condition for shifting to a power saving state.

Hereinafter, a procedure for determining the shift condition for the secondary storage device 15 to shift to the power saving state, which is executed by the CPU 11, will be described with reference to FIG. 2. The processing of each step shown in FIG. 2 can be implemented by the CPU 11 reading a control program stored in the flash memory 13, the secondary storage device 15 or the like and executing the control program.

Upon activation of the MFP 1 from a power off state, in step S101, the CPU 11 issues, to the secondary storage device 15, an IDENTIFY DEVICE command, which is a command defined by the ATA specification. Then, in step S102, the CPU 11 receives a response to the IDENTIFY DEVICE command from the secondary storage device 15, and obtains device information regarding the secondary storage device 15 from the response. The CPU 11 obtains, for example, rotation speed information regarding the rotation speed of the secondary storage device 15, as the device information.

In step S103, the CPU 11 performs discrimination of the type of the secondary storage device 15 based on the device information obtained in step S102. To be specific, the CPU 11 discriminates whether or not the secondary storage device 15 is a type of storage device in which the number of times of execution of OFF/ON operations (or in other words, the number of shifts to the power saving state) affects the lifetime of the storage device.

For example, if the rotation speed information obtained as the device information indicates a predetermined rotation speed (for example, 7200 rpm, 5400 rpm, or the like), the CPU 11 determines that the secondary storage device 15 is a storage device (a HDD in this example) in which the number of times of execution of OFF/ON operations affects the lifetime. If, on the other hand, the rotation speed information indicates a non-rotary medium (or in other words, a medium in which the disk is non-rotary), the CPU 11 determines that the secondary storage device 15 is a storage device (an SSD in this example) in which the number of times of execution of OFF/ON operations does not affect the lifetime.

Alternatively, in step S102, the CPU 11 may obtain, as the device information, the model name of the secondary storage device 15. In this case, in step S103, the CPU 11 may determine the type of the secondary storage device 15 by comparing the obtained model name with, for example, a list stored in advance in the flash memory 13.

Next, in step S104, the CPU 11 determines the shift condition for the secondary storage device 15 to shift to the power saving state according to the result of discrimination of the secondary storage device 15, which was performed in step S103. In the present embodiment, the CPU 11 determines the shift time, which is the period of time after completion of the last access to the secondary storage device 15 until the secondary storage device 15 starts shifting to the power saving state, as the shift condition for shifting to the power saving state.

To be specific, the CPU 11 determines the shift time to a different value depending on whether the secondary storage device 15 is a type of storage device (HDD) in which the number of times of execution of OFF/ON operations affects the lifetime or a type of storage device (SSD) in which the number of times of execution of OFF/ON operations does not affect the lifetime. For example, the CPU 11 determines the shift time for the type of storage device (SSD) in which the number of times of execution of OFF/ON operations (or in other words, the number of shifts to the power saving state) does not affect the lifetime, to be shorter than the shift time for the type of storage device (HDD) in which the number of times of execution of OFF/ON operations affects the lifetime.

In the present embodiment, in the case where the secondary storage device 15 is a HDD, the CPU 11 determines the shift time to shift to the power saving state such that power control for shifting the secondary storage device 15 to the power saving state can be executed at such a frequency that the lifetime will not be too short. Also, in the case where the secondary storage device 15 is an SSD, the CPU 11 determines the shift time to shift to the power saving state such that power control for shifting the secondary storage device 15 to the power saving state can be executed as frequently as possible. Through the processing as described above, it is possible to determine the shift time for the secondary storage device 15 to shift to the power saving state by taking into consideration the lifetime of the secondary storage device 15 and the power saving of the MFP 1.

Next, in step S105, the CPU 11 determines whether or not there is another secondary storage device 15 provided in the MFP 1, and if it is determined that there is another secondary storage device 15, then, the CPU 11 returns the processing to step S101 and determines the shift condition (shift time) for the other secondary storage device 15 to shift to the power saving state. When the determination of the shift condition for shifting to the power saving state has been made for all secondary storage devices 15, the CPU 11 ends the processing. After that, the CPU 11 performs power control for the secondary storage devices 15 in accordance with the shift conditions (shift times) determined through the above-described processing during activation of the MFP 1, so as to implement power saving in the MFP 1. With the processing as described above, power control for implementing power saving in the MFP 1 can be executed on the secondary storage device 15 more appropriately irrespective of whether a HDD or an SSD is provided as the secondary storage device 15 in the MFP 1.

<Example of Determination of Shift Time Required to Shift to Power Saving State>

Next, a specific example of a procedure for determining the shift time for the secondary storage device 15 to shift to the power saving state as the shift condition, which is executed by the CPU 11, will be described with reference to FIG. 3. The processing of each step shown in FIG. 3 can be implemented by the CPU 11 reading a control program stored in the flash memory 13, the secondary storage device 15 or the like and executing the control program.

Steps S201 and S202 are the same as steps S101 and S102. In step S203, the CPU 11 determines whether or not the secondary storage device 15 is a HDD by performing discrimination of the type of the secondary storage device 15 based on the obtained device information as in step S103. If it is determined that the secondary storage device 15 is a HDD, the CPU 11 advances the processing to step S204, and determines a protection time for the secondary storage device 15 to be 600 seconds. The protection time corresponds to a period of time for protecting the secondary storage device 15 from a situation in which the lifetime of the secondary storage device 15 is shortened as a result of the secondary storage device 15 being frequently shifted to the power saving state (as a result of OFF/ON operations being frequently executed). The CPU 11 controls the secondary storage device 15 such that the secondary storage device 15 does not shift to the power saving state after completion of the last access to the HDD until the protection time elapses. Accordingly, the protection time corresponds to the shift time to shift to the power saving state described above.

In the case where the secondary storage device 15 is a HDD, the CPU 11 determines the protection time (the shift time to shift to the power saving state) for the HDD to be a period of time (600 seconds in this example) predetermined based on a relationship between the number of shifts to the power saving state (the number of times of execution of OFF/ON operations) and the lifetime of the HDD. For example, in order to guarantee at least five years as the lifetime of the HDD, the protection time is set in advance to 600 seconds, which amounts to a number of times of execution of OFF/ON operations of the HDD in five years of 300,000 or less. By doing so, it is possible to prevent the HDD from shifting to the power saving state at a frequency more than once per 600 seconds. The protection time is not limited to 600 seconds, and may be set to a value determined by taking into consideration, for example, the external dimensions of the HDD, or the usage of the MFP 1.

If it is determined that the secondary storage device 15 is not a HDD (NO in step S203), or upon completion of the processing of step S204, the CPU 11 advances the processing to step S205. In step S205, the CPU 11 determines whether or not the secondary storage device 15 is an SSD. If it is determined that the secondary storage device 15 is an SSD, the CPU 11 advances the processing to step S206, and determines the shift time for the secondary storage device 15 to shift to the power saving state to be 0 seconds. That is, the CPU 11 determines the shift time such that the SSD shifts to the power saving state immediately upon completion of the last access to the SSD. As described above, in the case of the SSD, the number of times of execution of OFF/ON operations does not affect the lifetime. Accordingly, in this example, the shift time to shift to the power saving state is determined to be 0 seconds so as to cause the SSD to shift to the power saving state as frequently as possible, and thereby reduction in the power consumption of the MFP 1 is enabled.

If it is determined that the secondary storage device 15 is not an SSD (NO in step S205), or upon completion of the processing of step S206, the CPU 11 advances the processing to step S207. In step S207, as in step S105, the CPU 11 determines whether or not there is another secondary storage device 15 provided in the MFP 1, and if it is determined that there is another secondary storage device 15 provided in the MFP 1, the CPU 11 returns the processing to step S201 and determines the protection time or the shift time to shift to the power saving state also with respect to the other secondary storage device 15. If processing has been performed for all secondary storage devices 15, the CPU 11 ends the processing.

In the above-described processing, the protection time and the shift time to shift to the power saving state are determined for each of the HDD and the SSD, but the protection time and the shift time do not need to be distinguished. That is, the shift time to shift to the power saving state may be determined for the HDD and the SSD. By doing so, it becomes unnecessary to separately prepare a timer for measuring the protection time and a timer for measuring the shift time, and a common timer can be used to cause the HDD and the SSD to shift to the power saving state.

As described above, in the present embodiment, the CPU 11 determines the shift time for the secondary storage device 15 to shift to the power saving state based on the device information regarding the secondary storage device 15 provided in the MFP 1. In the case where the secondary storage device 15 is a type of storage device (SSD) in which the number of shifts to the power saving state does not affect the lifetime, the CPU 11 determines the shift time to be shorter than that in the case where the secondary storage device 15 is a type of storage device (HDD) in which the number of shifts to the power saving state affects the lifetime. By doing so, power control for implementing power saving in the MFP 1 can be executed on the secondary storage device 15 according to the type of storage device (HDD or SSD) provided as the secondary storage device 15.

Second Embodiment

Figure 3:
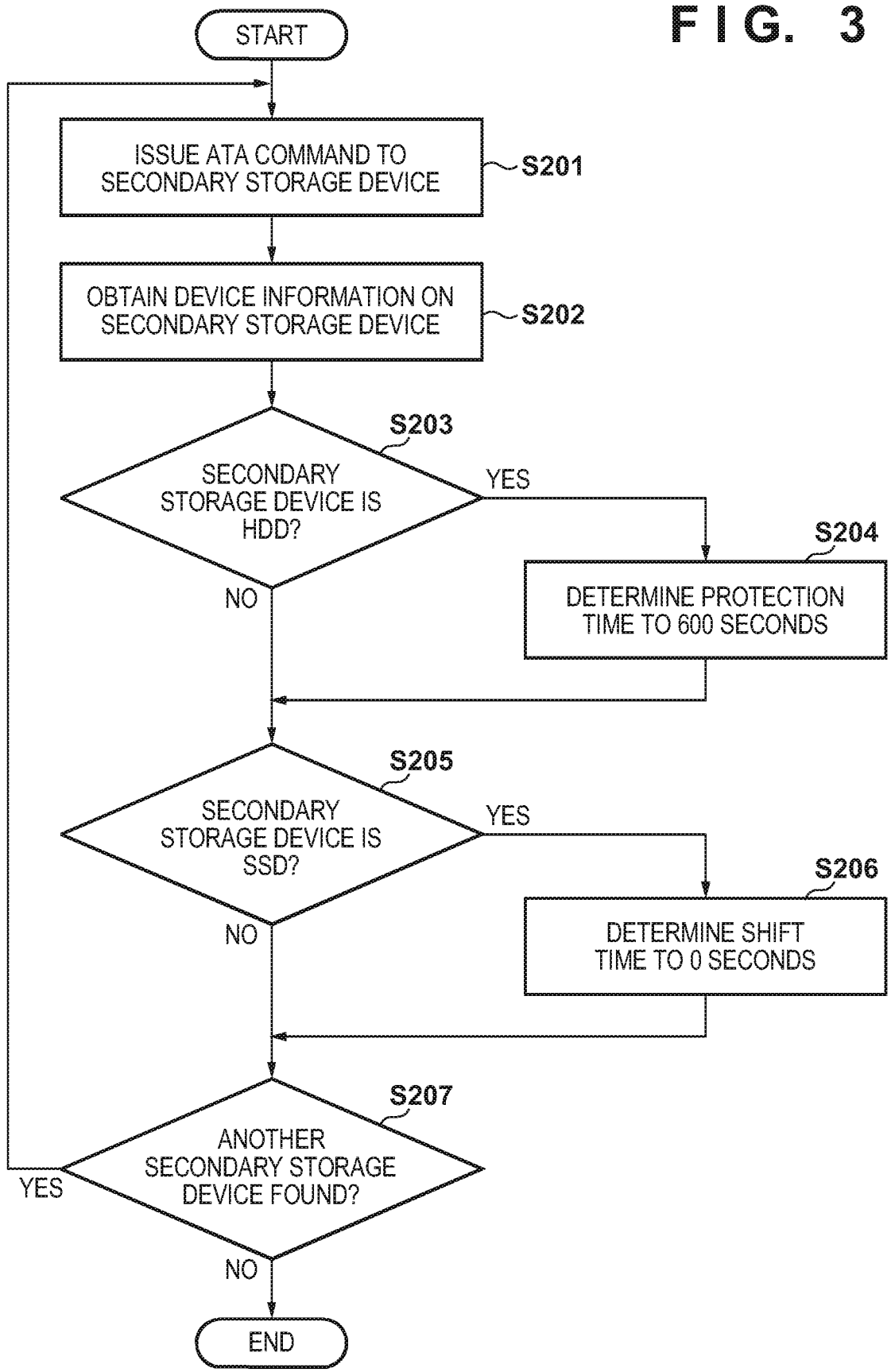
FIG. 3 is a flowchart illustrating a procedure for determining a shift time to shift to a power saving state.

In the example of the first embodiment shown in FIG. 3, the shift time to shift to the power saving state is set to 0 seconds if it is determined that the secondary storage device 15 is an SSD. In the present embodiment, an example will be described in which the shift time to shift to the power saving state is determined by taking into consideration the performance of the SSD. Hereinafter, for the sake of simplification of the description, the present embodiment will be described focusing on a difference from the first embodiment.

A specific example of a procedure for determining the shift time for the secondary storage device 15 to shift to the power saving state as the shift condition, which is executed by the CPU 11, will be described with reference to FIG. 4. The processing of each step shown in FIG. 4 can be implemented by the CPU 11 reading a control program stored in the flash memory 13, the secondary storage device 15 or the like and executing the control program. The present embodiment is different from the first embodiment in that, in the case where the secondary storage device 15 is an SSD, the shift time is determined based on a return time that is a period of time required for the SSD to return to the activation state from the power saving state, rather than determining the shift time to shift to the power saving state to be 0 seconds. That is, in FIG. 4, the processing of step S301 is performed instead of the processing of step S206 shown in FIG. 3.

Here, an SSD does not require spin-up, in contrast to a HDD, when it returns to the activation state from the power saving state, and thus the return time is shorter than that of the HDD, but the return time needs to be in the order of 10 ms to 100 ms. For this reason, if the shift time to shift to the power saving state is determined to be 0 seconds as in the first embodiment, the access speed to the SSD may decrease. To be specific, in the case where access (write access or read access) to the SSD is made at a fixed time interval, a processing delay (overhead) of 10 ms to 100 ms occurs for each access, causing a substantial reduction in the access speed. Accordingly, in the case where the shift time to shift to the power saving state is determined, for the SSD, to be an excessively short length of time (for example, 0 seconds) the performance of the SSD such as a high access speed may not be fully exerted even if power saving in the MFP 1 can be implemented.

To address this, in the present embodiment, in step S301, the CPU 11 determines the shift time to shift to the power saving state based on the return time that is a period of time required for the SSD to return to the activation state from the power saving state. In the present embodiment, the CPU 11 determines the shift time to shift to the power saving state to a period of time obtained by multiplying the return time by a predetermined ratio (for example, a factor of 50) that is greater than 1 (or in other words, the shift time is determined to be 50 times the return time). Here, a case is assumed where the return time of the SSD is 100 ms and the shift time is determined to be 200 ms. In this case, if access is made to the SSD at a frequency of, for example, once per 201 ms, a processing delay of 100 ms occurs for each access, and this processing delay exerts a relatively large influence. Likewise, a case is assumed where the return time of the SSD is 100 ms, and the shift time is determined to be 5000 ms. In this case, if access to the SSD is made, for example, once per 5001 ms, a processing delay of 100 ms occurs for each access, but this processing delay exerts a relatively small influence.

For this reason, the CPU 11 determines the shift time to be, for example, 50 times the return time based on the return time required for the SSD to return from the power saving state such that the SSD is not shifted to the power saving state so frequently. Note that the shift time for the SSD to shift to the power saving state may be determined to be a length of time other than 50 times the return time required for the SSD to return from the power saving state, or may be determined based on the usage of the MFP 1 without necessarily being determined depending on the return time required for the SSD to return from the power saving state. For example, the CPU 11 may determine the shift time for the SSD to shift to the power saving state based on a time interval between accesses to the SSD from a disk cache of an operating system running in the MFP 1. If access to the SSD is made from the disk cache of the operating system running in the MFP 1 every five seconds, the shift time may be determined to be, for example, two seconds.

To be more specific, in the MFP 1, access to the secondary storage device 15 is usually made via the disk cache provided in the operating system. In this case, access to the secondary storage device 15 (SSD), or to be specific, read access or write access of a certain size, is made at a frequency of once per several seconds. For example, in the case of write access, access from the disk cache to the secondary storage device 15 is made as a result of a set of ATA commands being issued a plurality of times per second. The issuance of the set of ATA commands depends on the designation of the user, but is performed at an interval of 5 seconds to 30 seconds. Accordingly, the shift time may be determined such that the secondary storage device 15 is shifted to the power saving during a period between accesses, rather than the secondary storage device 15 is shifted to the power saving state every time access is made from the disk cache to the secondary storage device 15 (SSD). With this configuration, it becomes possible to implement power saving in the MFP 1 while fully exerting the performance of the SSD.

As described above, according to the present embodiment, in the case where the secondary storage device 15 is an SSD, the shift time to shift to the power saving state can be determined so as to prevent a situation in which the performance of the SSD is not fully exerted as a result of the SSD being shifted to the power saving state too frequently. That is, power control of the secondary storage device 15 can be performed according to the type of the storage device (HDD or SSD) provided as the secondary storage device 15 while suppressing a reduction in the access performance caused by the return time required for the SSD to return from the power saving state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-175881, filed Sep. 8, 2016, which is hereby incorporated by reference herein in its entirety.

What is claimed is:

1. An information processing apparatus that can control a non-volatile magnetic storage device and can control a non-volatile semiconductor storage device, comprising:
one or more processors and one or more memories storing a program that causes the one or more processors to execute:
obtaining device information regarding a storage device provided in the information processing apparatus; and
setting a protection time in accordance with whether the obtained device information includes information corresponding to a semiconductor storage device or information corresponding to a magnetic storage device,
wherein the protection time is a period of time after completion of a last access to the storage device during an operation state until the storage device is caused to shift to a power saving state in which less power is supplied to the storage device than in a case where the storage device is in the operation state, and
wherein the protection time for the magnetic storage device is set to be longer than the protection time for the semiconductor storage device.

2. The information processing apparatus according to claim 1, wherein the protection time for the magnetic storage device is a length of time predetermined based on a relationship between a number of shifts to the power saving state and a lifetime of the magnetic storage device, and the protection time for the semiconductor storage device is 0.

3. The information processing apparatus according to claim 1, wherein the protection time for the semiconductor storage device is based on a return time that is a time period required for the semiconductor storage device to return from the power saving state.

4. The information processing apparatus according to claim 3, wherein the protection time for the semiconductor storage device is a period of time obtained by multiplying the return time by a predetermined ratio that is greater than 1.

5. The information processing apparatus according to claim 1, wherein the protection time of the semiconductor storage device is based on a time interval between accesses to the storage device from a disk cache of an operating system running in the information processing apparatus.

6. The information processing apparatus according to claim 1, wherein in the obtaining, the one or more processors further execute transmitting a predetermined command to the storage device and obtaining the device information from a response received from the storage device.

7. The information processing apparatus according to claim 1, wherein the device information includes rotation speed information indicating a rotation speed of a disk of the storage device.

8. The information processing apparatus according to claim 7, wherein the information corresponding to the magnetic storage device is the rotation speed information that indicates a predetermined rotation speed, and the information corresponding to the semiconductor storage device is the rotation speed information that indicates that the disk is non-rotary.

9. The information processing apparatus according to claim 1, wherein the device information includes information indicating a model name of the storage device.

10. The information processing apparatus according to claim 1, further comprising a printer that prints an image on a sheet based on image data,
wherein the storage device stores the image data.

11. The information processing apparatus according to claim 10,
wherein the one or more processors cause the information processing apparatus to shift to the power saving state upon an elapse of a predetermined time from completion of a job in the information processing apparatus, and
the one or more processors control each of shifting of the storage device to the power saving state and shifting of the information processing apparatus to the power saving state.

12. The information processing apparatus according to claim 1, wherein the one or more processors start causing the storage device to shill to the power saving state based on the set protection time.

13. The information processing apparatus according to claim 1, wherein in the obtaining, the device information is obtained in accordance with the information processing apparatus being activated.

14. A method for controlling an information processing apparatus that can control a non-volatile magnetic storage device and can control a non-volatile semiconductor storage device, the method being executed by one or more processors of the information processing apparatus and comprising:
obtaining device information regarding a storage device provided in the information processing apparatus; and
setting a protection time in accordance with whether the obtained device information includes information corresponding to a semiconductor storage device or information corresponding to a magnetic storage device,
wherein the protection time is a period of time after completion of a last access to the storage device during an operation state until the storage device is caused to shift to a power saving state in which less power is supplied to the storage device than a case where the storage device is in the operation state, and
wherein the protection time for the magnetic storage device is set to be longer than the protection time for the semiconductor storage device.

15. The method according to claim 14, wherein, in the obtaining, the device information is obtained in accordance with the information processing apparatus being activated.

16. A. non-transitory computer-readable storage medium storing a computer program for causing one or more processors of a computer to execute controlling an information processing apparatus that can control a non-volatile magnetic storage device and can control a non-volatile semiconductor storage device, the program comprising code to execute:
obtaining device information regarding a storage device provided in the information processing apparatus; and
setting a protection time in accordance with whether the obtained device information includes information corresponding to a semiconductor storage device or information corresponding to a magnetic storage device,
wherein the protection time is a period of time after completion of a last access to the storage device during an operation state until the storage device is caused to shift to a power saving state in which less power is supplied to the storage device than in a case where the storage device is in the operation state, and
wherein the protection time for the magnetic storage device is set to be longer the protection time for the semiconductor storage device.

17. The non-transitory computer-readable storage medium according to claim 16, wherein in the obtaining, the device information is obtained in accordance with the information processing apparatus being activate.

\* \* \* \* \*